Patented Oct. 3, 1944

2,359,707

UNITED STATES PATENT OFFICE 2,359,707

β-(2,5-DIMETHOXYPHENYL)-β-HYDROXY-ISOPROPYLAMINE

Richard Baltzly, New York, Edwin J. de Beer, Yonkers, and Johannes S. Buck, Albany, N. Y., assignors to Burroughs Wellcome & Co. (U. S. A.) Inc., New York, N. Y., a corporation of New York No Drawing. Application June 24, 1942, Serial No. 448,188

4 Claims. (Cl. 260—570.6)

This invention relates to β-(2,5-dimethoxyphenyl)-β-hydroxyisopropylamine and its neutral and acid salts and derivatives and to a method of making the same.

An object of the invention is to produce a substance of the above type having valuable and improved physiological properties.

Various other objects and advantages will be apparent as the nature of the invention is more fully disclosed.

Although the novel features which are characteristic of this invention are pointed out more particularly in the claims appended hereto the nature of the invention may be better understood by referring to the following description in which a specific embodiment thereof has been set forth for purposes of illustration.

We have found that β-(2,5-dimethoxyphenyl)-β-hydroxyisopropylamine may be prepared by a two stage reduction of 2,5-dimethoxy-α-isonitrosopropiophenone using a palladized charcoal catalyst for the first stage and a platinum catalyst for the second stage. The first reduction forms the ketoisopropylamine and the second reduction converts this to the hydroxyisopropylamine. The diacetyl derivative of the latter may be prepared from its hydrochloride by use of acetic anhydride. The reduction may in certain instances, take place in one stage using the platinum catalyst.

A more specific example follows:

2,5-dimethoxypropiophenone is treated in absolute ether with methyl nitrite and hydrogen chloride. The hydrochloride of 2,5-dimethoxy-α-isonitrosopropiophenone crystallizes out of the solution. It is removed, the base is liberated and crystallized from benzene-heptane, forming yellow leaflets that melt at about 97° C.-98° C.

This isonitrosoketone is dissolved in absolute alcohol containing an excess of hydrogen chloride and is hydrogenated with palladized charcoal, yielding β-(2,5-dimethoxyphenyl)-β-ketoisopropylamine hydrochloride, a salt that melts at about 176° C. with decomposition.

12.3 g. (1/20 mole) of β-(2,5-dimethoxyphenyl)-β-ketoisopropylamine hydrochloride (m. p. 176° C.) is dissolved in 50 cc. of water and hydrogenated with platinum oxide platinum black in the customary Adams-Burgess Parr apparatus. About 1/20 mole of hydrogen is absorbed, after which the solution is filtered off from the catalyst, evaporated to dryness in vacuo and recrystallized from absolute alcohol, absolute ether being added to decrease solubility. The hydrochloride is thus obtained in substantially theoretical yield. It crystallizes in plates and melts at 215° C.

The diacetyl derivative of β-(2,5-dimethoxyphenyl)-β-hydroxyisopropylamine is prepared by dissolving the hydrochloride in water, adding excess sodium hydroxide and sodium chloride, and extracting the base with ether. This solution is dried and the ether evaporated. The residual oil is heated on a steam-bath with acetic anhydride. On evaporation a substance is obtained melting at about 119° C.-120° C., crystallizing from ether-hexane and having the following formula, $C_{15}H_{21}O_5N$ β-(2,5-dimethoxyphenyl)-β-hydroxyisopropylamine possesses valuable and unexpected physiological properties. It is a powerful, long-acting pressor and a mydriatic. It is also a useful agent for shrinking nasal mucosa and has hemostatic properties.

Although a specific embodiment of the invention has been set forth for purposes of illustration it is to be understood that the invention is capable of various uses and that changes and modifications may be made therein as will be apparent to a person skilled in the art.

What is claimed is:
1. β-(2,5-dimethoxyphenyl)-β-hydroxyisopropylamine.
2. A salt of β-(2,5-dimethoxyphenyl)-β-hydroxyisopropylamine.
3. β-(2,5-dimethoxyphenyl)-β-hydroxyisopropylamine hydrochloride.
4. The method of producing β-(2,5-dimethoxyphenyl)-β-hydroxyisopropylamine which comprises hydrogenating 2,5-dimethoxy-α-isonitrosopropiophenone in the presence of a palladized charcoal catalyst to form β-(2,5-dimethoxyphenyl)-β-ketoisopropylamine hydrochloride and hydrogenating the latter in the presence of a platinum catalyst to produce β-(2,5-dimethoxyphenyl)-β-hydroxyisopropylamine.

RICHARD BALTZLY.
EDWIN J. DE BEER.
JOHANNES S. BUCK.